US006564334B1

(12) United States Patent
Zattiero et al.

(10) Patent No.: US 6,564,334 B1
(45) Date of Patent: May 13, 2003

(54) PROGRAMMABLE OUTPUT GENERATOR

(75) Inventors: Dennis G. Zattiero, Greenleaf, ID (US); David L. Durlin, Kuna, ID (US); Gyle D. Yearsley, Boise, ID (US)

(73) Assignee: Zilog, Inc., Campbell, CA (US)

( * ) Notice: Subject to any disclaimer, the term of this patent is extended or adjusted under 35 U.S.C. 154(b) by 0 days.

(21) Appl. No.: 09/452,662

(22) Filed: Dec. 1, 1999

(51) Int. Cl.[7] .................................................. G06F 1/02
(52) U.S. Cl. ...................................... 713/502; 327/106
(58) Field of Search ........................ 327/106; 704/258; 713/502

(56) References Cited

U.S. PATENT DOCUMENTS

| | | | | |
|---|---|---|---|---|
| 4,386,271 A | * | 5/1983 | Chiang et al. | 250/234 |
| 4,560,960 A | * | 12/1985 | Chanrion | 327/105 |
| 4,709,340 A | * | 11/1987 | Capizzi et al. | 704/262 |
| 4,719,593 A | | 1/1988 | Threewit et al. | |
| 4,825,416 A | | 4/1989 | Tam et al. | |
| 4,870,643 A | | 9/1989 | Bultman et al. | |
| 4,958,277 A | | 9/1990 | Hill et al. | |
| 5,734,877 A | | 3/1998 | Ries et al. | |

OTHER PUBLICATIONS

Intel 80C196KB User's Guide (Nov. 1990), Intel Corporation, pp. 1–94.
Intel 8XC196KC/8XC196KD User's Manual (1992) Chapter 8: "High–Speed Input/Output Unit" pp. 8–1–8–25.
Intel 8XC196KD Automotive Application Specification Update (May, 1997), Intel Corporation, pp. 1–23.
Intel 8XC196KD Commercial Application Specification Update (May, 1997), Intel Corporation, pp. 1–39.
Intel 8XC196KC Specification Update (May, 1997), Intel Corporation, pp. 1–51.
"Back to Basics: High Speed Output for the 8XC196KC/KD" (1999) pp. 1–8 http://developer.intel.com/design/MCS96/TECHNOTE/2382.HTM.

* cited by examiner

Primary Examiner—Thomas Lee
Assistant Examiner—Albert Wang
(74) Attorney, Agent, or Firm—Parsons Hsue & de Runtz LLP (57) ABSTRACT

A memory mapped programmable output generator, capable of producing events such as creating complex waveforms, triggering analog to digital and digital to analog conversions, and generating processor interrupts is disclosed. These events are considered high speed since they are timed relative to a high-speed clock and require minimal processor over head. The event generator may be embodied as either a peripheral to a microcontroller or as a separate circuit. In its preferred embodiment, the output generator is a peripheral device on a microcontroller and uses a dedicated programmable, reloadable timer which is inaccessible to other blocks. Events are loaded in a serial format, where only one event is active at a given time. These events are sequenced through address pointers associated with each event. Once a given event is completed, the output generator loads the next event from a next address pointer. The dedicated timer loads one event at a time, counts down to zero, then loads the next event time, counts down to zero, and continues in this manner until disabled, either externally by the CPU or internally as a result of a prescribed next address. The output generator preferably utilizes 64 dual port register blocks organized in program memory which is accessible to both the output generator and the top level CPU or microcontroller. In a data output mode, output generator pin events are byte wide, thereby allowing up to 8 bits to change during each POG event. Other modes can trigger events in other peripherals or generate an interrupt signal for the CPU.

29 Claims, 5 Drawing Sheets

POG Event Block

| Byte 0 | Byte 1 | Byte 2 | Byte 3 |
|---|---|---|---|
| POG Counter Low | POG Counter High | POG Data | POG Next Address/Ctl |
| 8 Bits | 8 Bits | 8 Bits | 6 Address Bits/ 2 Control |

*FIG._5*

POG Control Register

| 7 | 6 | 5 | 4 | 3 | 2 | 1 | 0 |
|---|---|---|---|---|---|---|---|
| POG Enable | POG Interrupt Enable | POG Interrupt Pending | Reserved | Reserved | Reserved | Pre-scale Bit 1 | Pre-Scale Bit 0 |
| 0 | 0 | 0 | 0 | 0 | 0 | 0 | 0 |
| R/W | R/W | R/W | R/W | R/W | R/W | R/W | R/W |

*FIG._6a*

POG Next Address Register

| 7 | 6 | 5 | 4 | 3 | 2 | 1 | 0 |
|---|---|---|---|---|---|---|---|
| POG Next Address 5 | POG Next Address 4 | POG Next Address 3 | POG Next Address 2 | POG Next Address 1 | POG Next Address 0 | POG Control 1 | POG Control 0 |
| 1 | 1 | 1 | 1 | 1 | 1 | 0 | 0 |
| R | R | R | R | R | R | R | R |

*FIG._6b*

POG Time Register Low Byte

| 7 | 6 | 5 | 4 | 3 | 2 | 1 | 0 |
|---|---|---|---|---|---|---|---|
| POG Timer 7 | POG Timer 6 | POG Timer 5 | POG Timer 4 | POG Timer 3 | POG Timer 2 | POG Timer 1 | POG Timer 0 |
| 0 | 0 | 0 | 0 | 0 | 0 | 0 | 0 |
| R | R | R | R | R | R | R | R |

*FIG._6c*

POG Time Register High Byte

| 7 | 6 | 5 | 4 | 3 | 2 | 1 | 0 |
|---|---|---|---|---|---|---|---|
| POG Timer 15 | POG Timer 14 | POG Timer 13 | POG Timer 12 | POG TImer 11 | POG Timer 10 | POG Timer 9 | POG Timer 9 |
| 0 | 0 | 0 | 0 | 0 | 0 | 0 | 0 |
| R | R | R | R | R | R | R | R |

*FIG._6d*

PROGRAMMABLE OUTPUT GENERATOR

BACKGROUND OF THE INVENTION

This invention relates to microprocessors, and more specifically, to programmable output generators.

Processing systems often employ output generators, either as an independent unit or as a peripheral device on a microcontroller. An example of such an independent device is a pulse width modulator for generating a digital timing waveform in response to a triggering signal, such as that described in U.S. Pat. No. 4,719,593 of Threewitt et al. As the demands placed on microprocessors have increased due to the ever larger number of application in which they are employed, such output generators are often employed as peripheral devices within a microcontroller device. An example of such a peripheral embodiment is the high-speed output module described on pp. 8–17 to 8–26 of 8XC196KC/8XC196KD *User's Manual* published by Intel, the manufacturer of that particular microcontroller.

As with other peripherals, this arrangement allows for a division of labor with special functions handled by dedicated units while the central processing unit tends to overall device control. When the output of waveform is needed, the CPU can simply supply an enable signal to the output generator rather than producing the waveform itself In this way, the CPU is free to perform other functions while supplying only minimal oversight to the output generator. Besides generating waveforms, a peripheral output generator can also produce other types of events besides generating waveforms, such as starting an analog to digital conversion or generating an interrupt.

As the applications in which microprocessors are used increases in both number and complexity, the desirability of output generators with greater ability and flexibility has correspondingly increased. This is true not just in terms of the need for more complex waveforms, as the processor must interact with a growing variety of increasingly complex devices, but also in the number of different functions which the output generator must perform.

SUMMARY OF THE PRESENT INVENTION

The present invention is a memory mapped programmable output generator, capable of producing events such as creating complex waveforms, triggering analog to digital and digital to analog conversions, and generating processor interrupts. These events are considered high speed since they are timed with relative to a high-speed clock and require minimal processor over head. The event generator may be embodied as either a peripheral to a microcontroller or as a separate circuit.

Programming event data, a next event address pointer, and an event time define an event block in a dual port RAM memory. In the preferred embodiment, a maximum of 64 events may be programmed. When an event begins, the event data and next address bytes are loaded into internal holding buffers and event time is loaded into a countdown timer. Once the programmable output generator is enabled, the first event is loaded into internal operating registers and the countdown timer will immediately begin counting. Once the timer counts to zero, the event will occur and the next address will point to the next event block. The data contained in this next RAM location will then be loaded and be executed at its programmed time. Subsequent events will continue to be loaded and executed until the output generator is either disabled or an event contains a prescribed value of the next address. If the next address is the prescribed value, the output generator will be disabled when this address is sensed and the event itself will not be executed.

In its preferred embodiment, the output generator is a peripheral device on a microcontroller and uses a dedicated programmable reloadable timer which is inaccessible to other blocks. Events are loaded in a serial format, where only one event is active at a given time. These events are sequenced through address pointers associated with each event. Once a given event is completed, the output generator loads the next event from a next address pointer. The dedicated timer loads one event at a time, counts down to zero, then loads the next event time, counts down to zero, and continues in this manner until disabled, either externally by the CPU or internally as a result of a prescribed next address. The output generator utilizes 64 dual port register blocks organized in program memory which is accessible to both the output generator and the top level CPU or microcontroller. In a data output mode, output generator pin events are byte wide thereby allowing up to 8 bits to change during each POG event. Other modes can trigger events in other peripherals or generate an interrupt signal for the CPU.

Additional objects, advantages, and features of the present invention will become apparent form the following description of its preferred embodiments, which description should be taken in conjunction with the accompanying drawings.

DESCRIPTION OF THE PREFERRED EMBODIMENT

Figure 1:
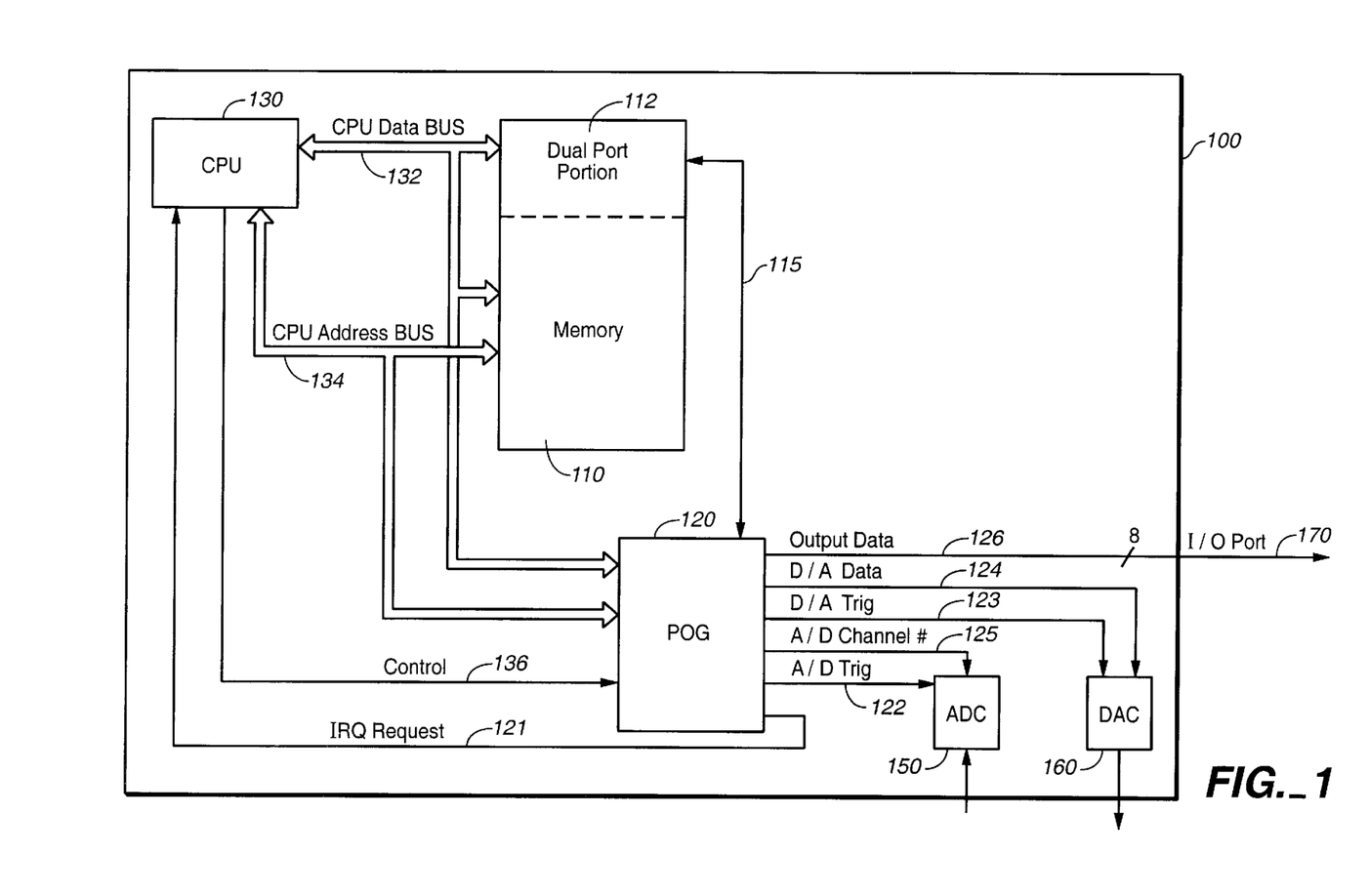
FIG. 1 is a simplified block diagram of a microprocessor showing the programmable output generator embodied as a peripheral device.

FIG. 1 shows the Programmable Output Generator (POG) 120 in its preferred application as a peripheral device on a microprocessor 100. This figure includes the POG 120, the central processing unit CPU 130, and the memory 110 with dual port section 112, along with some examples of peripherals to which the POG may be connected. Other possible elements of microprocessor 100 are suppressed to simplify the drawing. Although most of the following discussion is given in terms of the POG as a peripheral on the same chip as the rest of the processing system, in other embodiments it could also be implemented as an autonomous unit that would operate in response to an external enable signal.

In the preferred embodiment of FIG. 1, the POG 120 receives control input from CPU 130 along line 136. The program memory array 110 contains a dual port portion 112 with separate address decoding for both the CPU interface and the POG interface. This dual port portion is connected to POG 120, along 115, and to the CPU 130, through CPU data bus 132 for both reading and writing. The POG 120 has several outputs corresponding to some of the different types of output it can provide: an line 121 back to the CPU 130 for generating an interrupt, a trigger signal along 122 and channel number along 125 for Analog to Digital Conversion (ADC) in a peripheral ADC 150, a trigger signal along 123 and Digital to Analog Conversion (DAC) data along 124 for a peripheral DAC 160, and a line 126 to output data through an I/O port 170.

CPU data bus 132 is shown as split in its connection to memory 110 in order to emphasis the dual port nature of memory section 112. Both CPU data bus 132 and CPU address bus 134 are connected to POG 120 to turn on and otherwise provide control in this peripheral embodiment. As described below in reference to FIGS. 2 and 3, these buses are connected to the control registers of POG 120. CPU 130 preferably has a dedicated register to serve as an interface between it and POG 120. In a stand alone embodiment of the output generator, a buffer to the POG could incorporate this interface register.

Figure 2:
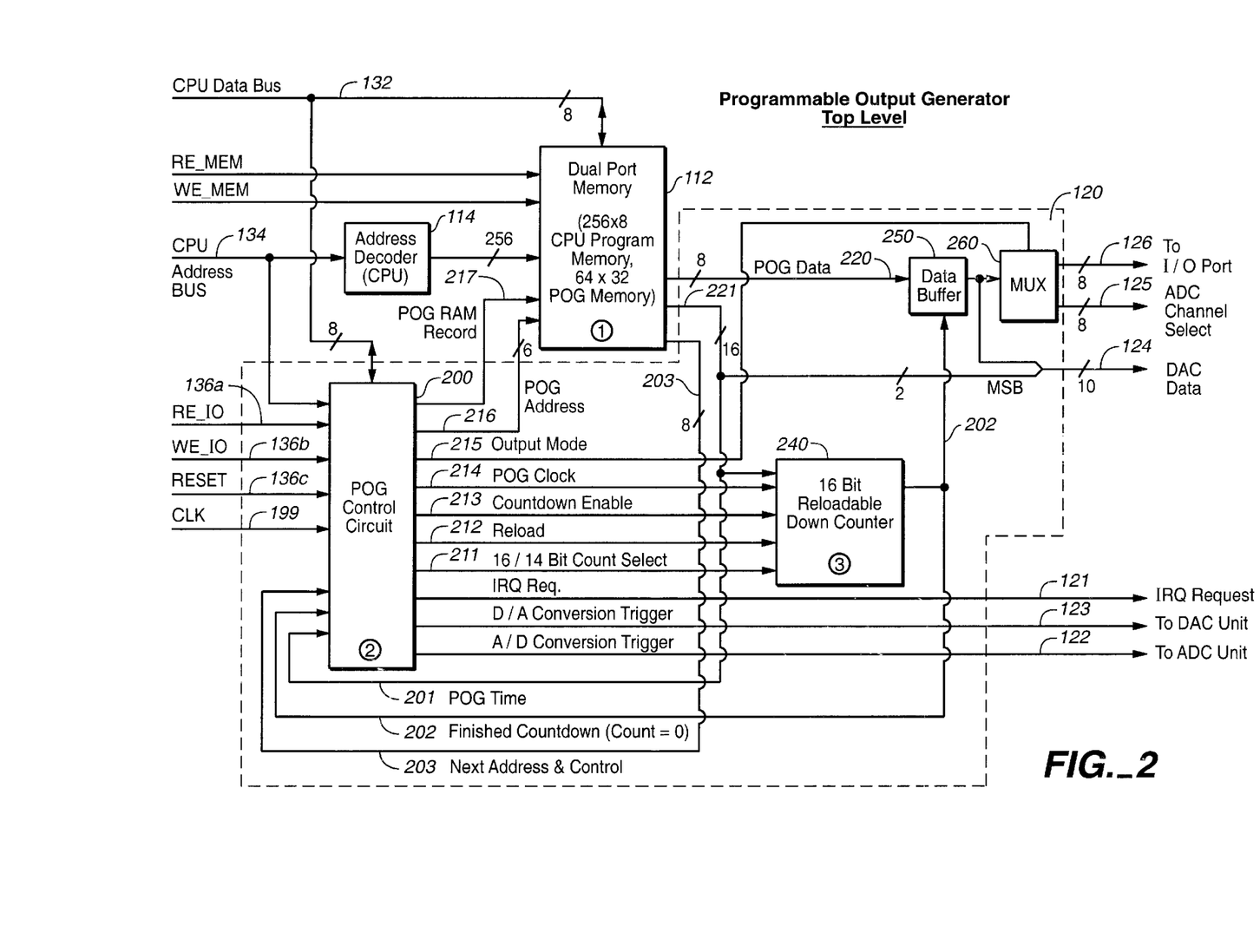
FIG. 2 is a high level block diagram of the programmable output generator.

FIG. 2 is a top level drawing of POG 120. This figure shows only the dual port portion 112, which consists of the top 256 bytes (64 event blocks) of the larger memory 110 in this embodiment. This dual port portion 112 is external to this peripheral embodiment, although in a stand alone embodiment it could be incorporated as an actual part of the output generator, but which was accessible by an external port. The address decoder (CPU) 135 is also not part of POG 120, but included to emphasis how the dual port memory 112 is organized differently as seen by the CPU than by the output generator. The various inputs are shown from the left, including the clock CLK 199 and control signals 136 (read and write enables RE_IO and WE_IO and RESET), and output signals are shown to the right.

The dual port memory 112 is a 256-byte memory segment from the CPU program memory array. When POG 120 is not going to be used, this segment is addressable as CPU program memory and can be written to and read from as conventional RAM. If POG 120 is going to be used, this memory segment will be programmed through the CPU interface with the POG event information. The memory is called dual port since it contains separate address decoding for both the CPU, by ADDRESS DECODER 114 along line 135, and the POG interface, along POG ADDRESS line 216. While the POG memory is physically accessible to both the CPU and the POG, its organization is different for the CPU 130 and the POG 120. As with the rest of the program memory, CPU 120 addresses the dual port memory 112 byte by byte, seeing it organized into 256×8 bits. This is emphasized by the notation on line 135. POG 120 instead addresses the dual port memory 112 four bytes at a time, organized as 64×32 bits. When used for the POG function, the 32 bit dual port output defines an event block containing a 16-bit timer value from POG TIME line 221, an 8-bit data value from POG DATA line 220, and the 8 bits of the next address and control along line 203.

The 16-bit timer value from POG TIME 221 is fed to a programmable reloadable down counter 240 with a zero count detector. When COUNT DOWN ENABLE is asserted on line 213, the counter 240 begins to count down this timer value using the POG CLOCK signal of line 214 and supplies a FINISHED COUNT signal on line 202 when the count reaches zero. The FINISHED COUNT signal 203 is supplied both to DATA BUFFER 250, so that the data stored from POG DATA 200 may be released, and to POG CONTROL CIRCUIT 200, in order to supply any corresponding trigger signals which may be needed. The POG TIME value is loaded into counter 240 in response to RELOAD signal 212. As described below, the counter 240 may load less than the full 16 bits of the POG TIME signal 221 in response to a BIT COUNT SELECT signal 211.

Figure 3:
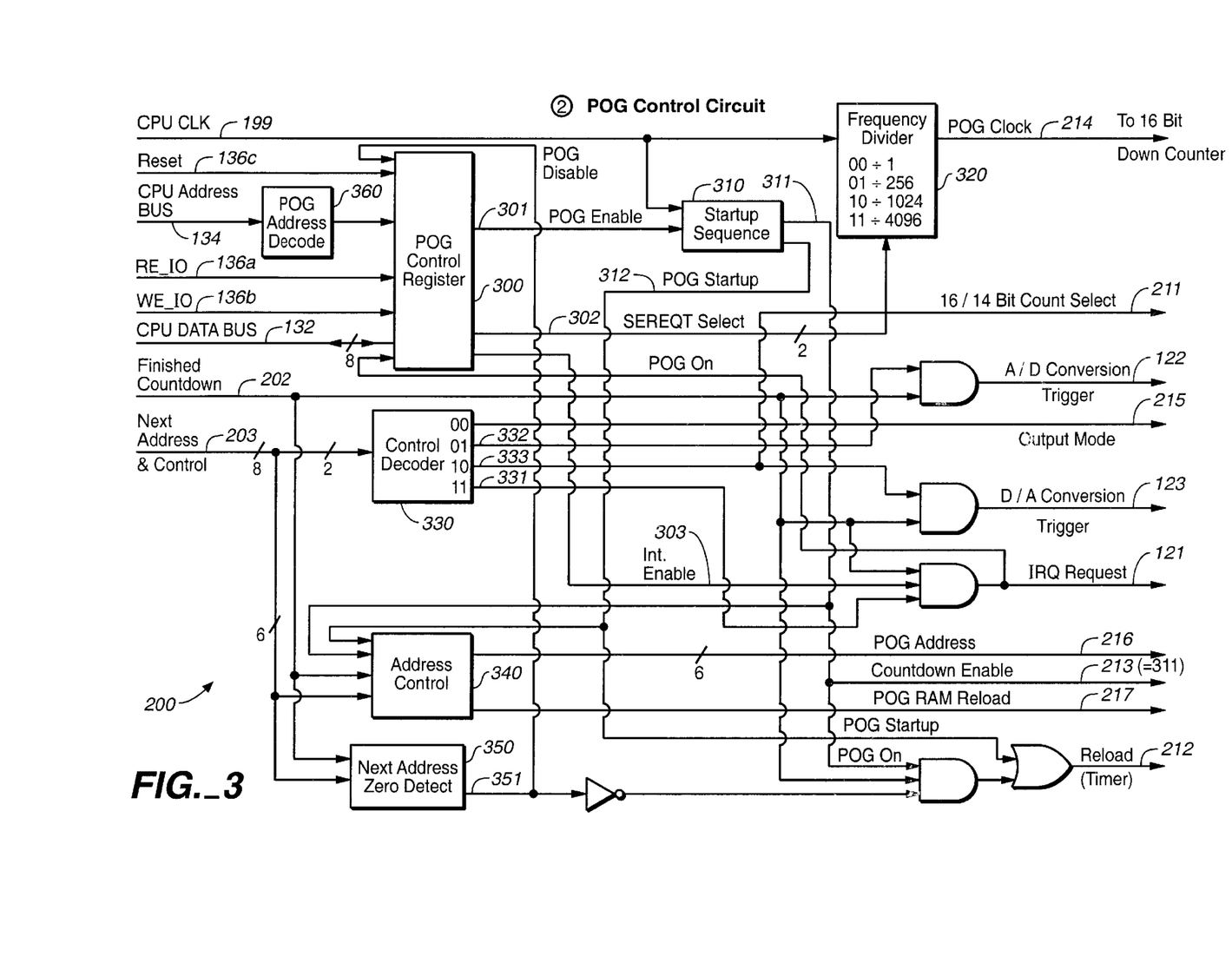
FIG. 3 is an exemplary embodiment of the control circuit of FIG. 2.

FIG. 3 is a block diagram of the POG control circuit 200. The elements of FIG. 3 will first be described briefly, with more detail of how they operate given after by use of the flowchart of FIG. 4. Again, the schematic symbols are just one possible realization: This embodiment is just an exemplary version to demonstrate the operation of the device, particularly with respect to the logic on the right hand side. In practice, these circuits are done in HDL and may be implemented in many ways.

Control circuit 200 contains the POG control register 300, which allows the CPU 130 to interface with the POG 120. This register sets the POG clock frequency, turns the POG off and on, enables the POG interrupts, and contains a POG interrupt pending bit. The clock frequency is set in FREQUENCY DIVIDER 320 by reducing the frequency of the CPU clock $\phi$ supplied on line 199 in response to the FREQ SELECT signal 302, thereby producing the POG CLOCK signal 214. When POG 120 is first enabled, the startup sequencer 310 activates the POG startup bit in response to POG ENABLE 301 to produce signal 312. This tells the address controller 340 to point the POG to address zero. Since the POG operates by one event block pointing to the subsequent event block, and since there is no event subsequent to the initial event, a first event block address must be specified. By convention, zero is always the starting address.

Once this is complete, the POG startup bit is de-asserted and the 16-bit timer 240 is loaded with a count (POG TIME 221) supplied from the dual port memory portion 112. At this point, the POG is initialized and the POG ON bit is enabled, producing signal 311. This allows the down counter 240 to begin counting down. When the counter has finished counting down to zero, the finished countdown bit (FINISHED COUNTDOWN 202) is asserted, thereby triggering the address controller 340 to read the NEXT ADDRESS 203 from the dual port memory portion 112. This NEXT ADDRESS 203 is also fed to CONTROL DECODER 330, which determines the event type of the next output, and NEXT ADDRESS ZERO DETECT 350, asserts POG DISABLE 351, should the next address, in fact, be zero.

Figure 4:
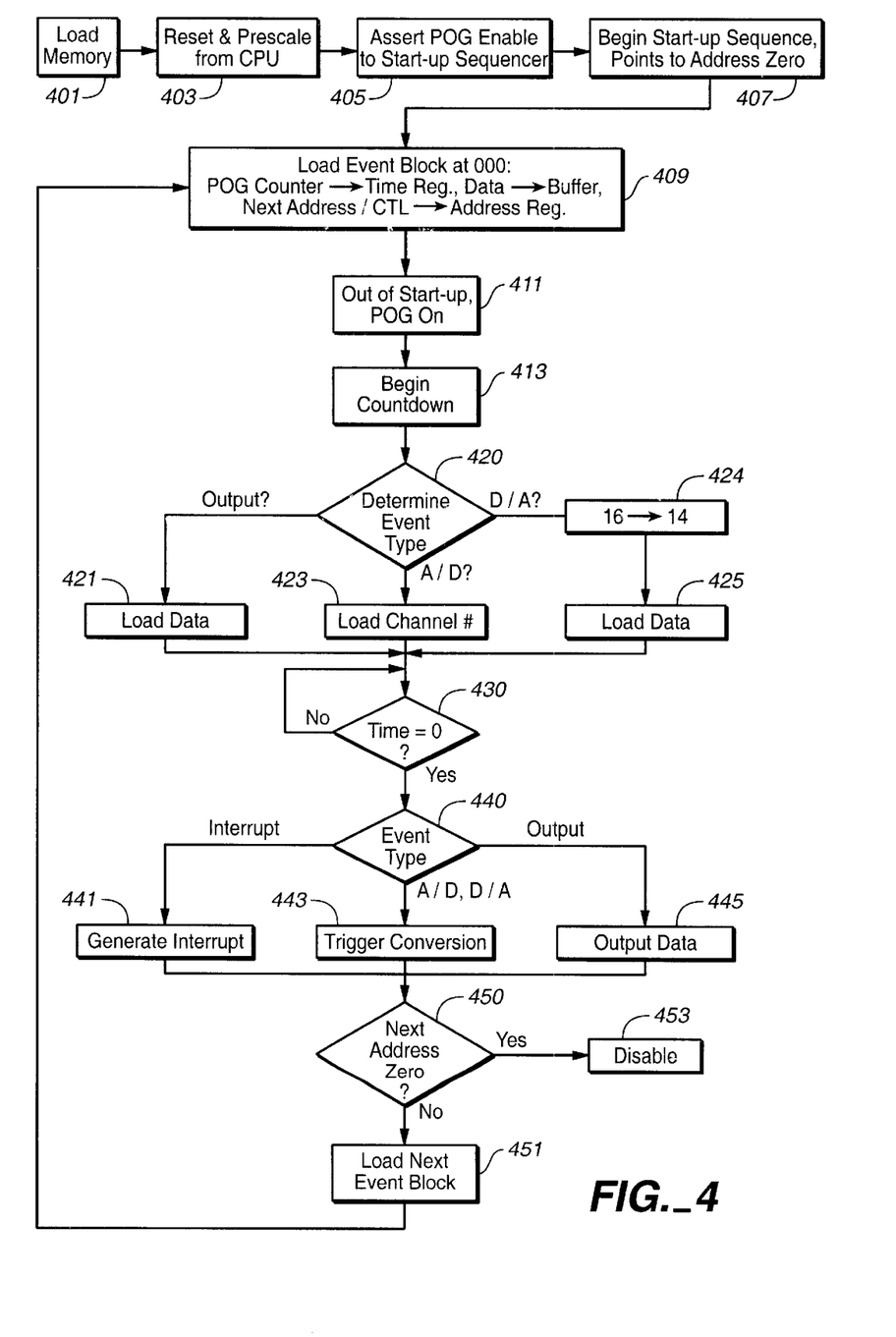
FIG. 4 is a flowchart describing a typical operation of the output generator elements shown in FIGS. 2 and 3.

FIG. 4 is a flowchart describing a typical operation of the output generator as embodied as the peripheral device of FIGS. 1–3. In initial step 401, CPU 130 loads the dual port memory 112 with the event blocks that output generator POG 120 will execute. In the preferred embodiment, up to 64 of these 4-byte event blocks can be stored in the dual port memory 112. The actual content programmed into these event blocks is determined by the purpose for which the microcontroller 100 will be used.

Figure 5:
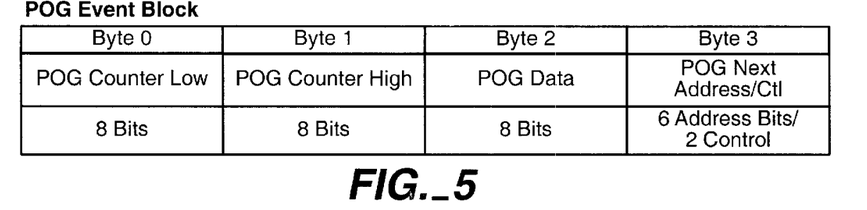
FIG. 5 is the preferred structure of an event block as seen in the dual port memory by the output generator.

FIG. 5 shows the structure of an event block. Bytes 0 and 1 of each event block contain the 16 bit event time that will comprise POG TIME 221. (The possible skimming off of two bits to DAC DATA 124 is discussed below with respect to 16/14 bit count select.) Byte 2 contains the actual event data which will form POG DATA 220: for example, if POG 120 is programmed for data output, the data contained in this byte will be output to I/O port 170 when the counter 240 counts down to zero. Byte 3 is the Next Address/Control bit to supply signal 203, 6 bits of which specify which of the 64 event block will occur next and 2 bits of which specify the event type.

In step 403, POG 120 is reset by CPU 130 (along RESET 136c) and the scaling factor is loaded into POG CONTROL REGISTER 300 from CPU 130. This scaling factor will be used by FREQUENCY DIVIDER 320 to obtain POG CLOCK 214 from CPU CLK 199. The structure of the actual registers within the control register block is shown in FIG. 6a.

Figure 6A:
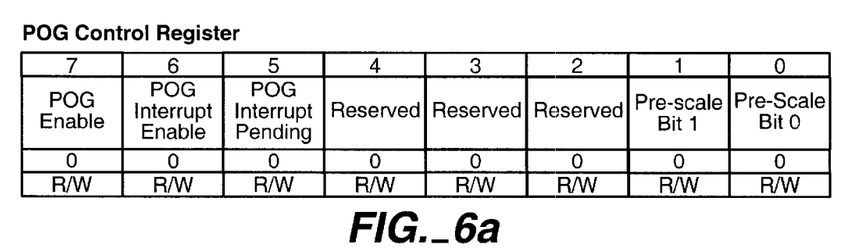
FIG. 6 shows the buffer structure within the output generator.

In FIG. 6a, the preferred embodiment of the control register is shown as containing 8 bits whose functions are labeled below the bit number. As with the other registers in FIGS. 6a–6d, the 0 or 1 under the function shows the reset state of the corresponding register bit, with the R or R/W under the 0 or 1 indicating if the register is read only or read/write as seen by the CPU. The entire control register can read or written to by the CPU. Bits 0 and 1 contain the prescaler that determine the scale factor for the clock frequency supplied to the POG. For a CPU clock frequency $\phi$, bits 1 and 0 of this prescaler allows the POG clock to run at $\phi$, $\phi/256$, $\phi/1024$, or $\phi/4096$ for the respective values of 00, 01, 10, and 11. As the POG events are timed relative to this high-speed clock from the CPU, they can themselves be considered high speed. These prescaler values should not be changed while the output generator is running. The software should preferably set the pre-scale prior to enabling POG 120, as this will ensure that FREQUENCY DIVIDER 320 receives the signal FREQ SELECT 302 before the counter starts. This will require two writes to the control register of FIG. 6a. Bits 2–4 are reserved. Bit 5 is the Interrupt Pending bit: If this bit has been written to 1 by IRQ REQUEST 121, a POG generated interrupt is pending. If bit 5 is written to 0, POG interrupt will be de-asserted. Bit 6 is set to 1 when the interrupt event option is enabled and is responsible for the signal INT ENABLE 303. Finally, Bit 7 is the POG Enable bit: If this bit is 0 the output generator is held in a reset state. When set to 1, POG 120 is enabled and counter 240 will begin to count down.

In step 405, POG ENABLE 301 is asserted to STARTUP SEQUENCER 310, beginning the start-up sequence of steps 407 and 409. When this sequence begins with step 407, POG ADDRESS 216 always points to address zero. Since, as described below, POG 120 operates in terms of the next event address, and since at start-up there has been no previous event to indicate this next event address, address zero is taken by convention to be the first event. Since the address of zero is always taken as the initial address, it is never a next address, allowing the use of a POG Next Address value of 00h to be reserved.

Figure 6B:
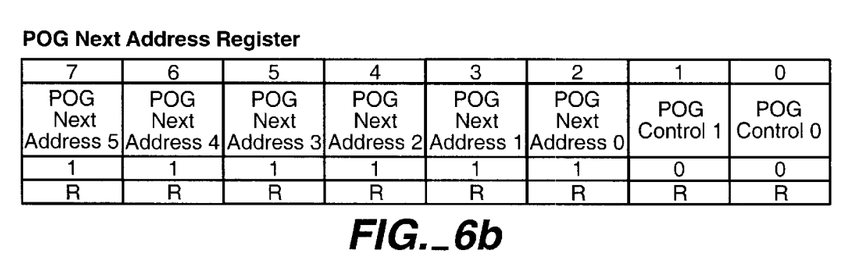
Figure 6C:
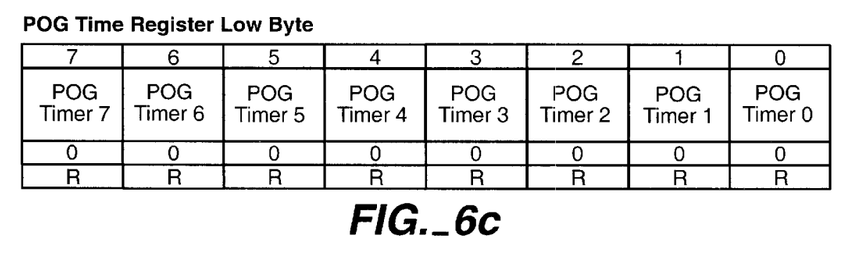
Figure 6D:
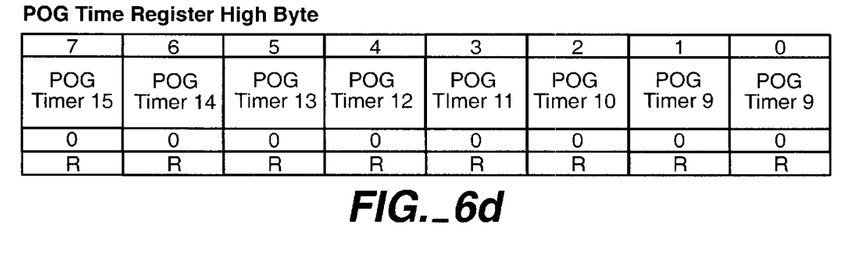

In step 407, Bytes 0 and 1 of the POG event block of FIG. 5 are loaded into the Timer Registers of FIGS. 6c and 6d, Byte 2 into DATA BUFFER 250, and Byte 3 into the Next Address Register of FIG. 6b. The timer registers are part of DOWN COUNTER 240 and receive their content by way of POG TIME 221. When the NEXT ADDRESS & CONTROL signal 203 arrives in CONTROL CIRCUIT 200, it is loaded into the next address register which is split between blocks 330 and 340. The location of the next address register as shown in FIG. 6b is split in FIG. 3 between ADDRESS CONTROL 340 and CONTROL DECODER 330 in order to distinguish the two functions of this register: Bits 0 and 1 of Byte 3 are control bits which go into the control decoder, while the six remaining bits go to address control to specify which of the 64 event blocks will be next. At this point the start-up sequence is done, the POG is on (Step 411), and the first event will occur when the count is zero.

Once POG ON 311 (which is the same as COUNT DOWN ENABLE 311) is asserted, the count down begins in step 413. In practice, steps 411 and 413 occur more or less simultaneously as part of the same clock cycle. Additionally, CONTROL DECODER 330 determines which event option the event block specifies in step 420. The present embodiment has four event options: data output mode, analog to digital (A/D) conversion, digital to analog (D/A) conversion, and interrupt generation, which correspond to bits 1 and 0 in the control portion of the Next Address Register (FIG. 6b) having the respective values 00, 01, 10, and 11. For the output mode of step 421, the data to be sent to I/O port 170 is loaded, while for A/D conversion of 423, the channel number for this conversion is loaded. Note that in this embodiment, both of steps 421 and 423 consist of loading data into DATA BUFFER 250, but are distinguished in FIG. 4 due to their differing data types. For the D/A conversion, the data of step 425 is the digital data to be converted to analog in DAC 160. For interrupt generation, data is ignored.

The D/A conversion has the additional bit count select of step 424. The purpose of having the flexible 16/14 bit count select is to further increase the flexibility of the output generator by allowing more than 8 bits of the POG Event Block to be dedicated to data. Although it could be used for any of the output modes and with differing number of bits, it is used here only for D/A conversion in order to allow 10 bit accuracy. In order to service the 10 bit D/A data, the upper two bits POG timer data supply the additional data. This occurs as part of step 424, as CONTROL DECODER 330 generates signal 333 which is the same as the 16/14 BIT COUNT SELECT 211 When this signal is asserted, COUTNTER 240 will load zeros into its two most significant bits, the other 14 bits coming from POG TIME 221, whose two most significant bits have been siphoned off to combine with the 8 bits from DATA BUFFER 250 to form DAC DATA 124. Thus, when an D/A operation is selected, events can only be scheduled with fourteen bits of accuracy in the down counter as the upper two bits are loaded with zero in this case. This is less limiting than it may appear since the clock rate can be controlled though FREQUENCY DIVIDER 320 by choice of the pre-scale factor.

These steps prepare the output generator to execute the event when the down counter reaches zero. Simultaneous with these steps, step 430 has also been running. Once the count finally reaches zero, the FINISHED COUTNTDOWN signal 202 is asserted to control circuit 220 to trigger the appropriate event and also to DATA BUFFER 250 to release the data. The event type is determined in step 440 based on the output of CONTROL DECODER 330. The combination of the FINISHED COUNTDOWN signal and the output of the control decoder in the logic circuits on the right of FIG. 3 will then result in the output occurring. Again, the particular realization shown in terms of the logic circuits of FIG. 3 should be viewed more as a schematic representation of the various conditions needed to produce the various events and signals described than as the actual embodiment.

If the programmed event is to generate an interrupt, step 441 follows and IRQ REQUEST 121 is sent to CPU 130, but only if the Interrupt Enable of the Control Register (bit 6) has been set. The interrupt request IRQ REQUEST 121 is also sent to the Control Register to set Interrupt Pending (bit 5). In this mode, the data byte of the event block is ignored.

If the event is programmed to generate an A/D or D/A conversion, when the count reaches zero the event is triggered in step 443 by supplying, respectively, either A/D TRIGGER 122 to ADC 150 or D/A TRIGGER 123 to DAC 160. For an A/D conversion, MUX 260 (based on the value of OUTPUT MODE 215) sends the contents of buffer 250 as ADC CHANNEL SELECT 125 to ADC 150. The preferred embodiment of microprocessor 100 has eight such channels, with the lower three bits of Byte 2 of the event block specifying the channel and the upper five bits being ignored. ADC 150 then performs an A/D conversion and stores the result in a register where it is available to CPU 130. For a D/A conversion, DAC 160 converts DAC DATA 124 into an analog output in response to D/A TRIG 123. In the preferred embodiment, this is a 10 bit D/A conversion, with the 10 bits being generated from the event block in manner described above with respect to 16/14 bit count selection in step 424.

If the event programmed is a data output, CONTROL DECODER 330 will generate OUTPUT MODE 215, in response to which MUX 260 will direct the data released from buffer 250 to I/O port 170 when the count equals zero. This output consists of a byte of data, OUTPUT DATA 126, that is preferably sent to one of the I/O ports also used by CPU 130, although this connection between the CPU and the I/O port is suppressed in FIG. 1 and other embodiments could have a dedicated port for the output generator.

By supplying an output of a byte of data, the data output mode increases the flexibility over a standard output generator and allows the POG to be used in a wider array of applications. This byte of data can be used to interface with other devices, either for other peripherals on the microcontroller chip or for accessing adjacent devices external to the chip. The data can also be used to generate pulse width modulated (PWM) waveforms, except that by having a byte of data, instead of the usual one or two bits, this data can be used either as separate bits to create a number of separate PWM waveforms or combined to create a more complex waveform. Through this is ability to produce more complex waveforms, the output of a byte of data results in a qualitative difference in the abilities of the output generator beyond just its quantitative change. Other examples of applications would include display array multiplexing or external clocking.

In Step 450, the next address zero detect block 350 checks the address of the next event to see if it is 00h. If so, the flow chart goes to step 453 and POG 120 is disabled. This is effected by asserting POG DISABLE 351 to the control register 300, whereby bit 7 of FIG. 6a is set to 0. Thus, if the POG Next Address (byte 3 of the event block) is zero, POG 120 will be disabled right after the address zero is sensed and the event itself will not be executed. Note that although this makes the event block at address 00h inaccessible as a next event, this block is not wasted as it is reserved for, and automatically accessed as, the initial event block in step 407.

If the next address is not zero, the next event block is loaded in step 451 much as the initial step was loaded back in step 409. This reloading is in response to the FINISHED COUNTDOWN signal 202, resulting in POG RAM RELOAD 217 being asserted by the address control block 340 and RELOAD 212 being asserted to the counter 240. The RELOAD signal 212 can be generated either in response to POG STARTUP 312, as part of start-up sequence, or in response to FINISHED COUNTDOWN 202, but only if both POG ON 311 is also asserted and POG DISABLE is de-asserted. This last condition prevents the counter from being reloaded if the next address is zero.

Once the next event block is loaded step 451, the flow returns back to step 413. The counter begins running and the steps are repeated until either a next address of 00h is found or until the CPU intervenes by disabling the POG Enable bit in the control register 300.

FIG. 4 presents the steps of the process in this particular order for ease of explanation. In actual operation, the output generator may execute some of these steps at roughly the same time or even in a rearranged order, as long as this does not effect operation. For example, step 450 may occur at the same time or even before step 440, as long as the event chosen in step 440 is executed before step 453.

As a result of being memory mapped, the described output generator has several important features which are somewhat obscured in FIG. 4. Since the event blocks are stored in the dual port portion 112 of memory, CPU 130 may write to this portion of the memory while POG 120 is running. This allows the CPU to modify the contents of the dual port memory, and consequently the output of the POG. This could be done in response to other information the CPU may have, as well as in response to what the programmed event blocks or POG control register contains, since the CPU can also read these. This allows the CPU to adapt the event blocks—and consequently the output—in a dynamic manner. In one particular example, two or more separate strings of event blocks may be programmed into the memory. While one string is running, the CPU can alter the block at address 00h, particularly its Next Address byte, so that when the first string finishes by disabling the POG, the CPU can reset the POG which will then immediately go to a second string of events pointed to by the modified Next Address byte of the initial event at 00h. Similarly, a string of events can branch to one of several paths by the CPU modifying the Next Address byte of the branching event block.

Another possibility is that in a string of events, the Next Address byte will point to an event block which has already been used earlier. In this situation, a closed loop will form. The output generator will continue to cycle through the events of this loop until the CPU intervenes to stop it.

Finally, inherent in this discussion is that the order in which the event blocks are executed is not the order in which they are stored in the dual port portion of the RAM memory. This is a direct result of its memory mapped structure. As one event block has a pointer to the next event block, these blocks can be executed in any order, and not just start at 0 and run down the list until being disabled.

Although most of the discussion above has been it terms of the described output generator as a peripheral device on a microprocessor, it should be noted that it is a state machine within itself, relying on the CPU only to program its memory and turn it on. As such, in other embodiments the POG could also be implemented as an autonomous unit that would operate in response to an enable signal to generate output. In this alternate embodiment, the output generator would consist of the items in FIG. 2, less ADDRESS DECODER 134 for the CPU; that is, the POG block of FIG. 2 plus the dual-port portion of the memory, which would then have the second port externally accessible for events to be programmed into it.

Whether used as a peripheral or as an autonomous unit, the described memory mapped structure results in a highly flexible output generator for scheduling events. The use of event blocks allows a cyclic structure of several events, such as generating an analog to digital conversion, generating a processor interrupt, accessing an adjacent system, generating a digital to analog conversion, and so on, to be performed all in an order. By appropriate choice of the next address, this cycle can either loop back on itself at some point or terminate. Additionally, the dual port structure of the memory not only allows the event blocks to programmed before the output generator is enabled, but lets them be changed while enabled for even greater adaptability.

Various details of the implementation and method are merely illustrative of the invention. It will be understood that various changes in such details may be within the scope of the invention, which is to be limited only by the appended claims.

What is claimed is:
1. A microprocessor, comprising:
  a central processing unit;

a system memory, at least a portion of which is a dual-ported memory that is accessible for reading and writing by the central processing unit through a first of said two ports; and an output generator, the dual-ported memory being accessible structured as event blocks by the output generator through a second of said two ports, comprising:
  a control circuit coupled to the central processing unit; and
  a counter, wherein when the control circuit is enabled by the central processing unit, the output generator provides a series of one or more output events, each of said output events being derived from a corresponding event block, the timing of each of said events determined by the counter from the corresponding event block.

2. A microprocessor, comprising:

a central processing unit;

a system memory, at least a portion of which is a dual-ported memory that is accessible for reading and writing by the central processing unit through a first of said two ports; and an output generator, the dual-ported memory being accessible structured as event blocks by the output generator through a second of said two ports, comprising:
  a control circuit coupled to the central processing unit; and
  a counter, wherein when the control circuit is enabled by the central processing unit, the output generator provides a series of one or more output events, each of said output events being derived from a corresponding event block, the corresponding event block for one output event determining the corresponding event block of the next output event in the series.

3. The microprocessor of either of claims 1 or 2, wherein the dual ported memory is accessible through the first of said two ports structured differently than as accessible through the second of said two ports.

4. The microprocessor of claim 3, wherein the dual port memory is accessible as conventional RAM through the first of said two ports.

5. The microprocessor of claim 2, wherein the timing of each of said output events is derived by the counter from said corresponding event block.

6. The microprocessor of any of claims 1, 2, or 5, further comprising:
  one or more analog to digital converters, wherein one of said output events includes selecting one of said analog to digital converters and triggering an analog to digital conversion therein.

7. The apparatus of claim 6, wherein the corresponding event block of said output event specifies which of said analog to digital converters is selected to perform the analog to digital conversion.

8. The microprocessor of any of claims 1, 2, or 5, further comprising:
  a digital to analog converter, wherein one of said output events includes triggering a digital to analog conversion of data derived from the corresponding event block in said digital to analog converter.

9. The microprocessor of any of claims 1, 2, or 5, wherein one of said output events include generating an interrupt signal for the central processing unit.

10. The microprocessor of any of claims 1, 2, or 5, further comprising:
  an output port, wherein one of said output events includes supplying data derived from the corresponding event block to said output port.

11. The microprocessor of claim 10, wherein said output port is an input/output port of said central processing unit.

12. The microprocessor of claim 10, wherein said data supplied to said output port are a byte of data.

13. The microprocessor of claim 5, wherein each of said event block includes:
  a counter field, from which said timing is determined;
  a data field, from which the data for data dependent outputs are derived; and
  a next address field, from which the corresponding event block of said next output event is determined.

14. The microprocessor of claim 13, wherein said event block further includes:
  a control field which specifies an output event type selected from one or more output event types.

15. The microprocessor of claim 14, further including:
  an output port;
  and wherein said output event types include:
    generating an interrupt for said central processing unit;
    triggering an analog to digital conversion;
    triggering a digital to analog conversion; and
    supplying data derived from said data field to said output port.

16. The microprocessor of claim 13, wherein the central processing unit provides the control circuit with a scaling factor and a clock rate, said timing being determined by the counter in response to said clock rate and dependent upon said scaling factor.

17. The microprocessor of claim 13, wherein a prescribed value for said next address field disables said control circuit.

18. A microprocessor, comprising:

a central processing unit;

a system memory, at least a portion of which is a dual-ported memory that is accessible by the central processing unit through a first of said two ports; and an output generator, the dual-ported memory being accessible structured as event blocks by the output generator through a second of said two ports, comprising:
  a control circuit coupled to the central processing unit; and
  a counter, wherein when the control circuit is enabled by the central processing unit, the output generator provides a series of one or more output events, each of said output events being derived from a corresponding event block, the corresponding event block for one output event determining the corresponding event block of the next output event in the series, wherein the timing of each of said output events is derived by the counter from said corresponding event block, wherein each of said event block includes:
    a counter field, from which said timing is determined;
    a data field, from which the data for data dependent outputs are derived; and
    a next address field, from which the corresponding event block of said next output event is determined,
  wherein the central processing unit is able to write to the dual-ported memory while the output generator in enabled.

19. A programmable output generator, comprising:

a memory, accessible for reading and writing by an external port and structured into event blocks, each of said event blocks structured to include:

a counter field;

a control circuit, responsive to an externally supplied enable signal; and a counter, wherein when said control circuit is enabled, the output generator provides a series of one or more output events, each of said output events being derived from a corresponding event block and occurring at a time derived by the counter from said counter field of the corresponding event block.

20. A programmable output generator, comprising:

a memory, accessible for reading and writing by an external port and structured into event blocks, each of said event blocks structured to include:

a next address field;

a control circuit, responsive to an externally supplied enable signal; and a counter, wherein when said control circuit is enabled, the output generator provides a series of one or more output events, each of said output events being derived from a corresponding event block, the next address field of the corresponding event block for one output event determining the corresponding event block of the next output event in the series.

21. The microprocessor of either of claims 19 or 20, wherein the memory is accessible as conventional RAM through the external port.

22. The programmable output generator of claim 20, wherein each of said event blocks is structured to further include:

a counter field, wherein each of said output events occurs at a time derived by the counter from said counter field of the corresponding event block.

23. The programmable output generator of either of claims 18 or 22, wherein a prescribed value for said next address field disables said control circuit.

24. The programmable output generator of any of claims 19, 20, or 22, wherein the memory may be accessed through said external port while said series of output events is being provided.

25. The programmable output generator of any of claims 19, 20, or 22, wherein each of said event blocks is structured to further include:

a control field, wherein each of said output events is of a type determined by said control field.

26. The programmable output generator of claim 25, wherein one or more of said series of output events includes generating an external control signal determined by said control field.

27. The programmable output generator of any of claims 19, 20, or 22, further comprising:

an output port, and wherein each of said event blocks is structured to further include:

a data field, wherein one or more of said series of output events includes supplying data derived from said data field externally through said output port.

28. The programmable output generator of claim 27, wherein said data supplied externally through said output port are a byte of data.

29. The programmable output generator of claim 26, further comprising:

an output port, wherein each of said event blocks is structured to further include:

a data field, wherein one or more of said series of output events includes supplying data derived from said data field externally through said output port.

* * * * *

UNITED STATES PATENT AND TRADEMARK OFFICE
CERTIFICATE OF CORRECTION

PATENT NO. : 6,564,334 B1
DATED : May 13, 2003
INVENTOR(S) : Zattiero et al.

It is certified that error appears in the above-identified patent and that said Letters Patent is hereby corrected as shown below:

Column 11,
Line 21, delete "The microprocessor" and insert -- The programmable output generator --.
Line 35, delete "claims 18 or 22" and insert -- claims 20 and 22 --.

Signed and Sealed this

Eighteenth Day of May, 2004

JON W. DUDAS
*Acting Director of the United States Patent and Trademark Office*